April 11, 1967 A. G. FUSELIER 3,313,019
TOOL FOR PULLING A PIN FROM A PIPE PROTECTOR
Filed Sept. 7, 1965

ALFRED G. FUSELIER
INVENTOR.

BY John O. Evans, Jr.

ATTORNEY

3,313,019
TOOL FOR PULLING A PIN FROM A PIPE PROTECTOR
Alfred G. Fuselier, Lafayette, La., assignor to Byron Jackson Inc., Long Beach, Calif., a corporation of Delaware
Filed Sept. 7, 1965, Ser. No. 485,213
2 Claims. (Cl. 29—252)

This invention relates to apparatus for pulling pins and the like, and particularly for pulling locking pins from split or hinged drill pipe protectors.

It is common practice in the rotary method of drilling wells to install rubber sleeves or bearings, generally known as drill pipe or casing protectors, on the drill pipe to reduce friction and wear on the outer surface of the pipe joints and the inner wall of the casing. These protectors, in order to facilitate installation and removal, are made with a longitudinal slit or opening on one or two sides, and with a cylindrical metal sleeve embedded in the rubber for reinforcement, the lateral ends of the metal being bent back and formed into interlocking loops. After constriction around the pipe a locking pin is inserted through the interlocking loops to retain the split protector on the drill pipe.

It is often desirable to remove the drill pipe protectors when storing the pipe or when drilling in uncased or open hole, so a means must be provided for pin removal. Heretofore, the common method for removing pins has been somewhat inconvenient, involving the use of two operators and two tools: a constricting tool to draw the protector ends together to release the tension of the metal loops against the pin, and a second or hook-type tool with a jarring or hammer-blow action to extract the pin mechanically.

Accordingly, it is a primary object of the present invention to provide a simple tool for extracting protector pins efficiently and easily.

Another object of the invention is to provide a tool for the extraction of protector pins which can be operated by fluid power.

An additional object of this invention is to provide a tool easily operable by one man, whether the pipe is in a horizontal position on a pipe rack or in a vertical position in the derrick.

Still another object is to provide a lightweight pin extractor tool for removing pins from split protectors of any size.

A further object of the invention is to provide a tool for extraction of pins from split or hinged protectors which will effect the removal without damage either to the protector or the pin, thus allowing them to be reused.

A still further object of the invention is to provide a tool which exerts opposing forces against the end of the protector and the head of its locking pin, resulting in relative movement of the two and extraction of the pin from the protector.

Briefly, the invention relates to a tool for pulling a pin from a pipe protector including a base having a gap therein, the base being adapted to rest upon a pipe protector with the gap receiving a pin extending from the pipe protector, pin engaging means, means for mounting the pin engaging means on the base for movement away from the base to withdraw the pin from the pipe protector through the gap, and power-operated means for moving the pin engaging means away from the base to withdraw the pin.

More particularly, the invention involves a fluid-operated tool, including a cylinder; a piston in sealing engagement to the inside of the cylinder; a piston rod extending from the piston to the outside of the cylinder at one end; a base connected to the outer end of the piston rod, the base having a pair of tines or fingers with a space or gap between and extending outward from the base; and a hook or claw attached to the outer surface of the cylinder, and in line with the gap of the base.

Still more particularly, the present invention is realized in a tool for pulling a pin from a pipe protector that encircles the pipe, the pipe protector having a shoulder lying in a plane substantially at right angles to the axis of the pipe, the pin being disposed generally parallel to the axis of the pipe and provided with a head portion projecting outwardly from the end surface. The tool includes a base, and a pair of tines extending laterally from one side of the base, the tines being adapted to rest against the shoulder of the pipe protector and spaced to straddle the projecting head portion of the pin, the tines having outer ends adapted to rest against the pipe for lining up the pin between the tines. The tool also includes hook means positionable between the tines for engaging the projecting head portion of the pin. The tool further includes means for mounting the hook means on the base for movement of the hook means away from a position between the tines to withdraw the pin from the pipe protector through the space between the tines, the means for mounting the hook means including fluid-powdered, piston and cylinder means for effecting that movement. The mounting means cooperates with the tines when the tines are resting against the pipe and the shoulder, whereby to assure the engagement of the hook means with the pin. The outer ends of the tines may be arcuate to conform to the contour of the pipe.

Further objects will appear as the invention is described with greater particularity in the following detailed description taken with the accompanying drawings.

In the drawings.

Like reference numerals in the various figures of the drawings and in the following description designate corresponding parts.

Figure 1:
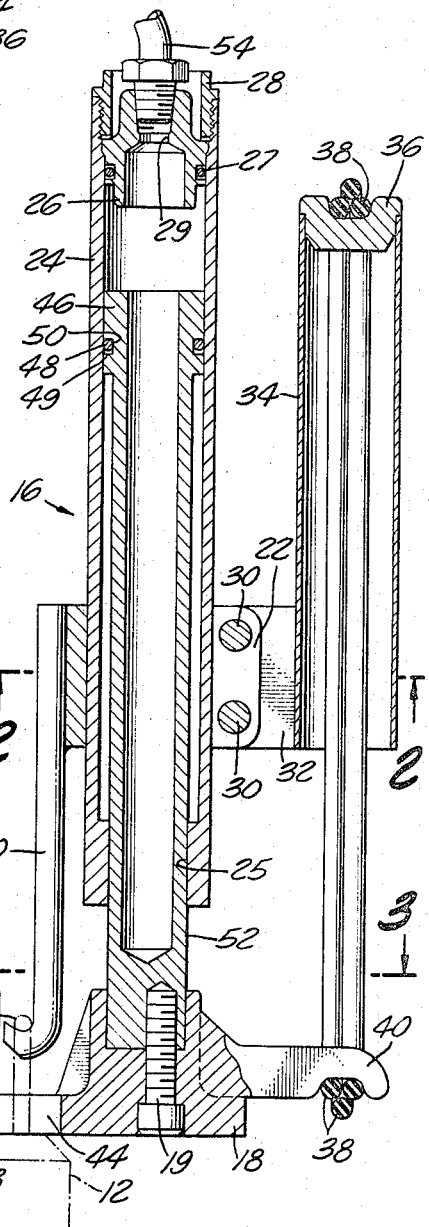
FIG. 1 is a longitudinal view, partly in section, of one form of the tool in accordance with the invention, shown in position ready to extract a pin from a drill pipe protector, the pin, protector and drill pipe being shown in phantom.

Referring to FIG. 1, there is shown in phantom view a drill pipe 10 with a protector 12 installed thereon with its locking pin 14. The pin puller tool 16 is shown with its base 18 resting on the shoulder 13 of the protector and its jaw 20 engaging the head of the pin 14, the jaw 20 being welded to the cylinder clamp 22, which is clamped to the cylinder 24 by means of the bolts 30, which also hold the handle bracket 32, welded to a tubular grip 34, with its spring-hook 36 from which the O-ring springs 38 are connected through the grip 34 to the base-hook 40. Inside of the cylinder 34 slides a piston 46 with an O-ring seal 48 and a back-up ring 49 in its groove 50. The piston rod 52 extends through the small opening 25 of the cylinder 24 and is connected by means of a screw 19 to the base 18. The other end of the cylinder 24 is sealed off by a plug 26 with its O-ring 27 and a retaining sleeve 28. Access to the inside of the cylinder 24 is provided through a hole 29 of the plug 26, to which is connected a fluid line 54.

Figure 2:
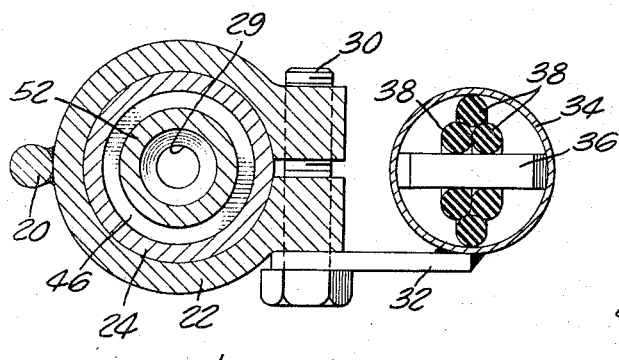
FIG. 2 is a sectional view through the clamp of the tool, on an enlarged scale, taken on the line 2—2 of FIG. 1, looking in the direction of the arrows.

The parts of the tool shown in FIG. 2 have already been described with reference to FIG. 1.

Figure 3:
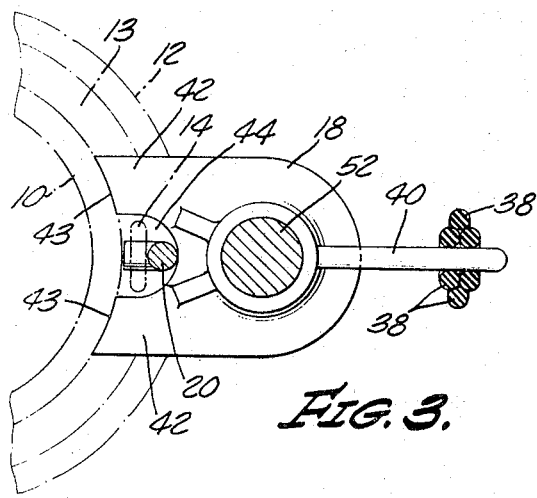
FIG. 3 is a top view of the base of the tool, partly in section, taken on the line 3—3 of FIG. 1, looking in the direction of the arrows.

Referring now to FIG. 3, the tines 42 of the base 18 are spaced apart to form a gap 44, with the ends of the tines 43 abutting the drill pipe 10.

Figure 4:
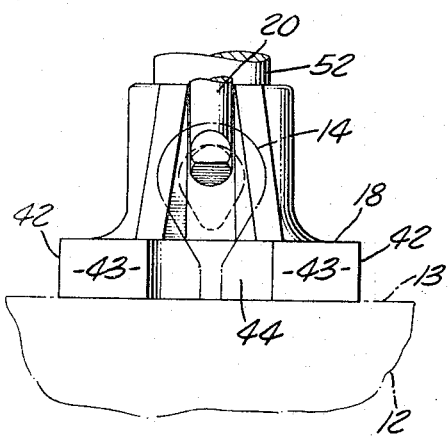
FIG. 4 is a fragmentary front view on an enlarged scale showing the base of the tool, taken on the line 4—4 of FIG. 1, looking in the direction of the arrows.

Referring to FIG. 4, all parts shown have previously been described with reference to FIGS. 1 and 3.

In a typical operation of the tool of this invention to extract a pin 14 from a protector 12 which is in place on a drill pipe 10, the tool 16 is held by its grip 34 in a position parallel to the pipe 10, the tines 42 of the base 18 resting on the shoulder 13 of the protector and the outer ends 43 of the tines against the pipe 10, lining up the protector pin 14 with the gap 44 between the tines. The jaw or hook 20 is then hooked into the protruding end or eye of pin 14 and fluid under pressure from an outside source (not shown) allowed to enter the cylinder 24 through the fluid line 54 to urge the piston 46 and the cylinder plug 26 apart. The piston being connected by its piston rod 52 to the base 18, and the jaw 20 by its clamp 22 to the cylinder 24, there results a relative movement of base and jaw apart; and the tines 42 of the base 18 bearing against the shoulder 13 of the protector 12 while the jaw 20 is connected to the pin 14, there results the movement of the pin 14 away from the protector 12 and its extraction therefrom. Upon release of fluid from the cylinder through the fluid line 54, the rubber springs 38 connected between the hook 40 of the base 18 and the hook 36 of the grip 34, the piston 46 is retracted back into the cylinder 24, the base 18 and jaw 20 converging thereupon to their initial positions, ready for another pin extraction.

While one form of the tool has been shown by way of illustration, it should be understood that various modifications will occur to one skilled in the art. For example, referring to FIG. 1, the base 18 might be fixed to the cylinder 24 and the jaw 20 to the piston rod 52, the device being inverted so that movement of the piston 46 results in a relative divergence of hook and jaw in a direction to extract the pin from the pipe protector. Also, retraction of the piston and base could be accomplished by fluid power against the piston 46 rather than mechanically by the pull-back springs 38; or, conversely, divergence of base and hook could be accomplished mechanically rather than by hydraulic or pneumatic means.

I claim:

1. A tool for pulling a pin from a pipe protector that encircles the pipe, the pipe protector having a shoulder lying in a plane substantially at right angles to the axis of the pipe, the pin being disposed generally parallel to the axis of the pipe and provided with a head portion projecting outwardly from said end surface, said tool comprising in combination:
   (a) a base;
   (b) a pair of tines extending laterally from one side of said base, said tines being adapted to rest against the shoulder of said pipe protector and spaced to straddle the projecting head portion of said pin, said tines having outer ends adapted to rest against the pipe for lining up said pin between said tines;
   (c) hook means positionable between said tines for engaging the projecting head portion of said pin;
   (d) means for mounting said hook means on said base for movement of said hook means away from a position between said tines to withdraw the pin from the pipe protector through the space between said tines;
   (e) said means for mounting said hook means including fluid-powered, piston and cylinder means for effecting said movement; and
   (f) said mounting means cooperating with said tines when the tines are resting against the pipe and the shoulder whereby to assure the engagement of said hook means with the pin.

2. A tool as defined in claim 1 wherein the outer ends of said tines are arcuate.

References Cited by the Examiner

UNITED STATES PATENTS

| | | | |
|---|---|---|---|
| 587,979 | 8/1897 | Leineweber | 92—132 X |
| 2,099,592 | 11/1937 | Barton | 254—30 X |
| 2,693,633 | 11/1954 | Wood | 29—236 |
| 2,797,889 | 7/1957 | Talboys | 254—18 |
| 2,967,044 | 1/1961 | Corcreham et al. | 254—30 |
| 2,994,510 | 8/1961 | Michalak | 254—30 |
| 3,158,052 | 11/1964 | Biach | 254—29 |

WILLIAM FELDMAN, *Primary Examiner.*

MILTON S. MEHR, *Examiner.*